//www.google.com/

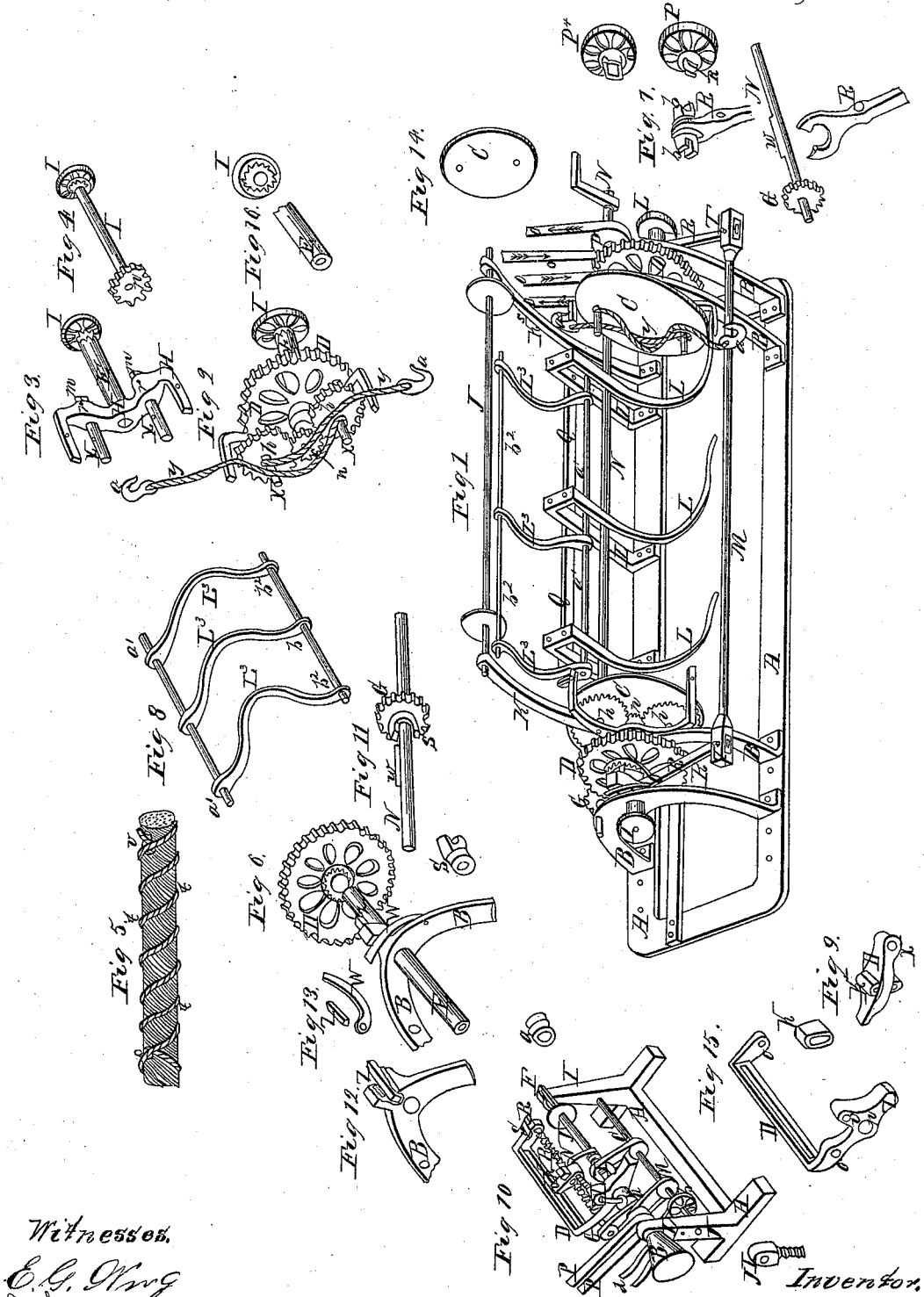

UNITED STATES PATENT OFFICE.

ELIAS T. FORD, OF STILLWATER, NEW YORK.

IMPROVEMENT IN MACHINES FOR PRESSING STRAW.

Specification forming part of Letters Patent No. 52,838, dated February 27, 1866.

*To all whom it may concern:*

Be it known that I, ELIAS T. FORD, of the town of Stillwater, county of Saratoga, and State of New York, have invented new and useful Improvements in a Straw-Press; and I do hereby declare that the following is a full, clear, and exact description of the invention.

Figure 1 is a side perspective view of the straw-press in nearly all of its parts. Fig. 5 illustrates a gavel of straw in a bound state. Figs. 2, 3, 4, 6, 7, 16, 11, 12, 13, 14 are detached sections of Fig. 1, showing certain parts more distinctly.

Like letters refer to like parts in all of the drawings of Fig. 1.

The nature of my invention consists in a machine so constructed as to embrace and retain each extremity of a gavel of straw or other like material by certain devices and pressing the same by twisting the gavel and holding the straw in the compressed state by running a continuous band around the gavel spirally and reversely to the twist thereof. The gavel is secured at each extremity by tying the band, as seen in Fig. 5.

Having thus described the nature of my invention, I will now proceed to describe the construction and operation of the same, which is as follows, to wit:

I construct the base-frame A as seen in Fig. 1, upon which I locate the tubular centers E E, supported by their sectional frames B B B B, as seen arranged in Fig. 1 at the right and left portion of the frame A, with their spur-gears D D, hand-wheels I I, center or tension shafts, F F, and pinions $n$ $n$ attached, as also seen in Figs. 4 and 2. The pinions $n$ $n$ are made rigid to the shafts F F. These shafts are inserted through the tubular centers E E. The hand-wheels I I are fastened to the right and left extremities of the tension-shafts F F, one of which may be seen in Figs. 4 and 2. Fig. 2 further illustrates two other larger spur-gears, $h$ $h$, arranged with and connected to the pinion $n$, and being secured upon the wrists X X as their centers. The wrists X X have their bearings $r$ $r$ upon each side of the concave sections H H H H at the points $r$ $r$, and may be retained to the same by nuts $m$ $m$ $m$ $m$. The sections H H, as seen in Figs. 1, 2, and 3, at the right, are the same as that intended and arranged at the left, portions of which are seen in Fig. 1.

The sections H H are inserted upon one extremity of each tubular spindle or center E E.

The letter C in Figs. 1 and 14 illustrates a circular plate protecting the pinions $n$ $n$ and gear $h$ $h$ $h$ $h$ from the straw, having their bearings or supports upon the wrists X X X X. The plates C C are left off in Fig. 2 in order to present the spur-gears $h$ $h$ $h$ $h$. Upon each of the four wrists X X X X, I attach the cords or chains Y Y Y Y to the wrists X X X X by passing one extremity of the cords through the orifices made within the wrists X X X X. The opposite ends of the cords or chains Y Y Y Y are provided with the hooks $a$ $a$ $a$ $a$, as seen in Figs. 1 and 2.

The right spur-gear D is attached to the right center E between the sections B B, similar to that of the left. The left spur-gear D is permitted to turn backward with its attachments, and this gear D also is provided with a hub in form of a ratchet at the side, as may be seen in Figs. 6 and 1. The same gear D and the left center E are prevented from turning to the rear by the catch Z operated by the spring W, and both being arranged on the sectional frame B, as seen in Figs. 6, 13, and 12. The dog or catch Z is pressed into the ratchet of the hub D and the gear D is permitted to turn to the front by the peculiar form of the ratchet and catch Z. I now locate the rear drive-shaft, N, with its attachments, within its bearing or orifices made upon the rear portion of the sectional frames B B B B, as seen in Figs. 1 and 6.

Upon the driving-shaft N, I place the left pulley $P^4$. The shaft N is provided with two feathers, $w$ $w$, as seen in the sectional parts of the same in Figs. 7 and 11. Fig. 7 also represents the right double clutch $b$ $b$, which is placed upon the driving-shaft N, receiving the feather $w$, and located adjacent to the left pulley $P^4$, as also seen at the right of Fig. 7. The right pulley P is located upon the shaft N at the right of the feather $w$, and double clutch $b$ $b$ arranged with the right lever R, as also seen in Fig. 1. The right pinion G is located upon the driving-shaft N at the left of the left pulley $P^4$, as seen before in Fig. 7, arranged upon a line with and connected to the pinion G and right spur-gear D.

In Fig. 1 the pinion G is rigidly placed to the shaft N, and farther to the left upon shaft N another pinion, G, is placed at the right and at the left of the feather *w*, as seen in Figs. 11 and 1. It is provided with a clutch, S, formed with the gear. The left pinion G revolves upon the shaft N, being upon a line and connected to the left spur-gear D, and at the left of the pinion G, I place the clutch S, as seen at the left of Fig. 11, receiving the left feather *w*, this clutch being grooved interiorly also for the reception of the feather *w*.

Circular grooves are made upon the right and left clutches *b b* and S for the reception of the right and left levers R R. The form may be seen just below Fig. 7. The fulcrums of the levers R R are erected just in front of the driving-shaft N, they being united to the base-frame A. I connect the front extremities of the levers R R by the connecting-rod M, and they are made movable upon the pins at the points T T. Elongated mortises are made within the heads of the connecting-rod M for the free movement of the levers R R.

The sections $L^7 L^7$ are attached to the base-frame A, and so formed or bent as to constitute the front concaves, L L, or straw-supports, as seen in Fig. 1, and for the further support of the sections $L^7$, I attach the bent bar Q Q. The extremities of the same are so bent at right angle, extending forward, as to form bearings for the shaft $a' a'$ of the upper concaves, $L^3 L^3$, the construction of which may be seen in Fig. 8, and arranged upon its bearings in Fig. 1, raised up.

The standards $K^5 K^5$ are erected upon the base-frame A, extending upward and supporting the center, with spool J mounted thereon.

Operation: Fig. 1, as the machine is set in motion by the left pulley P, the pulley turning as indicated by the arrow, and the right pinion G being connected to the right spur-gear D, thereby moving the center E with its attachments from front to the rear, and the gavel is placed within the concave heads H H H H, and then the right front cord Y is passed over the gavel to and hooked to the rear portion of head H. Likewise the rear cord Y is connected to the front prong of the right head H; also, in like manner the left extremity of the gavel is embraced by the ropes or cords Y Y. I now turn the hand-wheels I I, as seen in Figs. 4 and 2, moving the pinions *n n*, also the four spur-gears *h h h h*, right and left, thereby turning the wrist or contracting shaft X X X X right and left and reverse to each other, winding up and contracting the cords Y Y Y Y upon each shaft X X X X, thereby holding firmly each extremity of the gavel. I now move the connecting-rod M with the levers R R to the right, thereby connecting the left pulley P to the rear driving-shaft, N, consequently turning the right concave head H H with the right portion of the gavel, while the left portion of the concave head H H with the left portion of the gavel remain still. The shaft N, moving through the left pinion G and at the same time the left spur-gear D, is held by the catch Z as connected to a portion of the frame B, as before stated. The catch Z is operated by the spring W, and one end of the same is attached to the sectional frame B, as seen in Fig. 6. The catch Z enters the ratchet formed with the hub of left spur-gear D. I now move the hand-levers R R by means of the connecting-rod M, as before stated, to the left, thereby reversing the motion of the right concave head H H with the gavel, and the left concave head H H for the left clutch G is now connected to the rear shaft N by means of the left clutch S moving upon the feather *u*, as seen in Fig. 11, and by this movement, also, the right clutch *b* comes in contact with the right pulley P, and the same motion now is communicated to each of the heads H H H H and gavel, holding the compression caused by the twist given to the gavel, and at the right head H H the left spur-gear D is connected to the shaft N, and the catch Z permits the head H or center E to revolve with its attachments reverse to the former motion, and at the same time holding the compression of the gavel; but before the reverse motion is given to the machine and gavel I take the end of the band upon the spool J and bring it around the right extremity of the gavel and tie the same. At this time the machine is set in reverse motion, and the band is rendered though the hand and its inclination is given to the left, terminating at the left extremity of the gavel in a spiral form and here tied, thereby holding the straw or other like material in a compressed state and in place.

The upper concave section or sections, $L^3 L^3$, as seen in Fig. 8, may be used to temporarily press loose straw at the time of securing the extremities of the straw forming the gavel, to facilitate the connection of the hooks *a a a a* of cords Y Y Y Y, and is effected by lowering the section or concaves $L^3 L^3$ upon the gavel, and then a pressure made by the hand or foot; but this section $L^3$ is elevated before the application of the band.

The gavel is relieved from its end gripers by reversing the hand-wheels I I and disconnecting the hooks *a a a a* of cords Y Y Y Y.

The compression is effected by the twisting of the gavel of straw, hay, cotton, or other similar material.

Having thus described the invention and improvements set forth in this specification, what I claim, and desire to secure by Letters Patent, is—

1. The compression of a gavel of straw or other material of like fiber forming a bundle or bale by twisting and holding the same in place and winding it spirally in an opposite direction to that of the twist, with a twisted band, *t*, of straw or similar material, formed separately, and rendered from the spool J before the gavel is relieved from its end gripes, X Y X Y, substantially as described.

2. The arrangement of tubular centers E E, tension-shafts F F, gear D D, pinions *n n*, gear *h h h h*, wrists X X X X, bearings *r r r r*, cords or chains Y Y Y Y, hooks *a a a a*, guardplates C C, and sectional frames B B B B resting upon base-frame A, substantially as and for the purpose specified.

3. The employment of the ratchet of the left gear D, with catch Z and spring W, for holding the center E, and therewith the left extremity of gavel $t$, in its compressed state while motion is imparted to the right center and gavel in the application of band $t$, substantially as described.

4. The arrangement of the rear driving-shaft, N, with the right and left clutches $b\ b$ S, pinions $G^6$ G, levers R R, connecting-rod M, pivots T T, right pulleys P $P^4$, substantially as and for the purpose described.

5. The arrangement of the lower and stationary arms, L $L^7$, upper concaves, $L^3\ L^3$, and rod $b^2$, hinged in the bar Q Q, in combination with standards $K^5\ K^5$, having the upper center and spool J mounted thereon, in the manner and for the purpose set forth.

ELIAS T. FORD.

Witnesses:
 E. G. WING,
 JOSHUA ANTHONY.